United States Patent
Venshtain et al.

(10) Patent No.: US 9,942,481 B2
(45) Date of Patent: *Apr. 10, 2018

(54) SYSTEMS AND METHODS FOR ITERATIVE ADJUSTMENT OF VIDEO-CAPTURE SETTINGS BASED ON IDENTIFIED PERSONA

(71) Applicant: PERSONIFY, INC., Chicago, IL (US)

(72) Inventors: Simion Venshtain, Chicago, IL (US); Sanjay Patel, Champaign, IL (US); Dennis J. Lin, Chicago, IL (US)

(73) Assignee: Personify, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/339,274

(22) Filed: Oct. 31, 2016

(65) Prior Publication Data
US 2017/0048440 A1    Feb. 16, 2017

Related U.S. Application Data

(63) Continuation of application No. 14/145,880, filed on Dec. 31, 2013, now Pat. No. 9,485,433.

(51) Int. Cl.
*H04N 5/235* (2006.01)
*H04N 5/232* (2006.01)
(Continued)

(52) U.S. Cl.
CPC ............ *H04N 5/2352* (2013.01); *G06T 7/11* (2017.01); *G06T 7/143* (2017.01); *G06T 7/194* (2017.01);
(Continued)

(58) Field of Classification Search
CPC ............. H04N 5/2352; H04N 5/23219; H04N 5/23296
See application file for complete search history.

(56) References Cited

U.S. PATENT DOCUMENTS 5,001,558 A    3/1991   Burley
5,022,085 A    6/1991   Cok
(Continued)

FOREIGN PATENT DOCUMENTS

WO    2013019259    2/2013

OTHER PUBLICATIONS

Kitagawa et al., "Background Separation Encoding for Surveillance Purpose by using Stable Foreground Separation", APSIPA, Oct. 4-7, 2009, pp. 849-852.
(Continued)

*Primary Examiner* — Sean Conner
*Assistant Examiner* — Pinalben Patel
(74) *Attorney, Agent, or Firm* — Invention Mine LLC (57) ABSTRACT

Disclosed herein are systems and methods for iterative adjustment of video-capture settings based on identified persona. In an embodiment, a method includes receiving video frames that are being captured by a video camera of an ongoing scene. The method also includes identifying a persona in one or more of the received frames at least in part by identifying, in each such frame, a set of pixels classified as being representative of the persona. The method also includes selecting, based collectively on the brightness values of the pixels in the identified set, a respective adjustment command for one or more adjustable video-capture settings of the camera, as well as outputting the selected commands to the camera for use in continuing to capture video data representative of the ongoing scene.

20 Claims, 5 Drawing Sheets

(51) Int. Cl.
  *H04N 5/243*       (2006.01)
  *H04N 7/14*        (2006.01)
  *G06T 7/73*        (2017.01)
  *G06T 7/11*        (2017.01)
  *G06T 7/143*       (2017.01)
  *G06T 7/194*       (2017.01)
  *G06K 9/00*        (2006.01)

(52) U.S. Cl.
  CPC ............. *G06T 7/73* (2017.01); *H04N 5/2353* (2013.01); *H04N 5/23219* (2013.01); *H04N 5/23296* (2013.01); *H04N 5/243* (2013.01); *H04N 7/147* (2013.01); *G06K 9/00234* (2013.01); *G06K 9/00288* (2013.01); *G06T 2207/10016* (2013.01); *G06T 2207/30196* (2013.01)

(56) References Cited

U.S. PATENT DOCUMENTS

| | | | |
|---|---|---|---|
| 5,117,283 | A | 5/1992 | Kroos |
| 5,227,985 | A | 7/1993 | DeMenthon |
| 5,343,311 | A | 8/1994 | Morag |
| 5,506,946 | A | 4/1996 | Bar |
| 5,517,334 | A | 5/1996 | Morag |
| 5,534,917 | A | 7/1996 | MacDougall |
| 5,581,276 | A | 12/1996 | Cipolla |
| 5,631,697 | A | 5/1997 | Nishimura |
| 5,687,306 | A | 11/1997 | Blank |
| 5,875,040 | A | 2/1999 | Matraszek |
| 6,119,147 | A | 9/2000 | Toomey |
| 6,125,194 | A | 9/2000 | Yeh |
| 6,150,930 | A | 11/2000 | Cooper |
| 6,288,703 | B1 | 9/2001 | Berman |
| 6,411,744 | B1 | 6/2002 | Edwards |
| 6,618,444 | B1 | 9/2003 | Haskell |
| 6,661,918 | B1 | 12/2003 | Gordon |
| 6,664,973 | B1 | 12/2003 | Iwamoto |
| 6,760,749 | B1 * | 7/2004 | Dunlap .................. H04N 7/147 348/14.08 |
| 6,798,407 | B1 | 9/2004 | Benman |
| 6,937,744 | B1 | 8/2005 | Toyama |
| 6,973,201 | B1 | 12/2005 | Colmenarez |
| 7,050,070 | B2 | 5/2006 | Ida |
| 7,124,164 | B1 | 10/2006 | Chemtob |
| 7,317,830 | B1 | 1/2008 | Gordon |
| 7,386,799 | B1 | 6/2008 | Clanton |
| 7,420,490 | B2 | 9/2008 | Gupta |
| 7,420,590 | B2 | 9/2008 | Matusik |
| 7,463,296 | B2 | 12/2008 | Sun |
| 7,512,262 | B2 | 3/2009 | Criminisi |
| 7,518,051 | B2 | 4/2009 | Redmann |
| 7,574,043 | B2 | 8/2009 | Porikli |
| 7,599,555 | B2 | 10/2009 | McGuire |
| 7,602,990 | B2 | 10/2009 | Matusik |
| 7,631,151 | B2 | 12/2009 | Prahlad |
| 7,633,511 | B2 | 12/2009 | Shum |
| 7,634,533 | B2 | 12/2009 | Rudolph |
| 7,668,371 | B2 | 2/2010 | Dorai |
| 7,676,081 | B2 | 3/2010 | Blake |
| 7,692,664 | B2 | 4/2010 | Weiss |
| 7,720,283 | B2 | 5/2010 | Sun |
| 7,742,650 | B2 | 6/2010 | Xu |
| 7,747,044 | B2 | 6/2010 | Baker |
| 7,755,016 | B2 | 7/2010 | Toda |
| 7,773,136 | B2 | 8/2010 | Ohyama |
| 7,821,552 | B2 | 10/2010 | Suzuki |
| 7,831,087 | B2 | 11/2010 | Harville |
| 7,912,246 | B1 | 3/2011 | Moon |
| 7,965,885 | B2 | 6/2011 | Iwai |
| 8,073,196 | B2 | 12/2011 | Yuan |
| 8,094,928 | B2 | 1/2012 | Graepel |
| 8,131,011 | B2 | 3/2012 | Nevatia |
| 8,146,005 | B2 | 3/2012 | Jones |
| 8,175,379 | B2 | 5/2012 | Wang |
| 8,175,384 | B1 | 5/2012 | Wang |
| 8,204,316 | B2 | 6/2012 | Panahpour |
| 8,225,208 | B2 | 7/2012 | Sprang |
| 8,238,605 | B2 | 8/2012 | Chien |
| 8,249,333 | B2 | 8/2012 | Agarwal |
| 8,264,544 | B1 | 9/2012 | Chang |
| 8,300,890 | B1 | 10/2012 | Gaikwad |
| 8,300,938 | B2 | 10/2012 | Can |
| 8,320,666 | B2 | 11/2012 | Gong |
| 8,331,619 | B2 | 12/2012 | Ikenoue |
| 8,331,685 | B2 | 12/2012 | Pettigrew |
| 8,335,379 | B2 | 12/2012 | Malik |
| 8,345,082 | B2 | 1/2013 | Tysso |
| 8,355,379 | B2 | 1/2013 | Thomas |
| 8,363,908 | B2 | 1/2013 | Steinberg |
| 8,379,101 | B2 | 2/2013 | Mathe |
| 8,396,328 | B2 | 3/2013 | Sandrew |
| 8,406,494 | B2 | 3/2013 | Zhan |
| 8,411,149 | B2 | 4/2013 | Maison |
| 8,411,948 | B2 | 4/2013 | Rother |
| 8,422,769 | B2 | 4/2013 | Rother |
| 8,437,570 | B2 | 5/2013 | Criminisi |
| 8,446,459 | B2 | 5/2013 | Fang |
| 8,446,488 | B2 | 5/2013 | Yim |
| 8,477,149 | B2 | 7/2013 | Beato |
| 8,503,720 | B2 | 8/2013 | Shotton |
| 8,533,593 | B2 | 9/2013 | Grossman |
| 8,533,594 | B2 | 9/2013 | Grossman |
| 8,533,595 | B2 | 9/2013 | Grossman |
| 8,565,485 | B2 | 10/2013 | Craig |
| 8,588,515 | B2 | 11/2013 | Bang |
| 8,625,897 | B2 | 1/2014 | Criminisi |
| 8,643,701 | B2 | 2/2014 | Nguyen |
| 8,649,592 | B2 | 2/2014 | Nguyen |
| 8,649,932 | B2 | 2/2014 | Mian |
| 8,655,069 | B2 | 2/2014 | Rother |
| 8,659,658 | B2 | 2/2014 | Vassigh |
| 8,666,153 | B2 | 3/2014 | Hung |
| 8,682,072 | B2 | 3/2014 | Sengamedu |
| 8,701,002 | B2 | 4/2014 | Grossman |
| 8,723,914 | B2 | 5/2014 | Mackie |
| 8,818,028 | B2 | 8/2014 | Nguyen |
| 8,831,285 | B2 | 9/2014 | Kang |
| 8,854,412 | B2 | 10/2014 | Tian |
| 8,874,525 | B2 | 10/2014 | Grossman |
| 8,890,923 | B2 | 11/2014 | Tian |
| 8,890,929 | B2 | 11/2014 | Paithankar |
| 8,897,562 | B2 | 11/2014 | Bai |
| 8,913,847 | B2 | 12/2014 | Tang |
| 8,994,778 | B2 | 3/2015 | Weiser |
| 9,008,457 | B2 | 4/2015 | Dikmen |
| 9,053,573 | B2 | 6/2015 | Lin |
| 9,065,973 | B2 | 6/2015 | Graham |
| 9,084,928 | B2 | 7/2015 | Klang |
| 9,087,229 | B2 | 7/2015 | Nguyen |
| 9,088,692 | B2 | 7/2015 | Carter |
| 9,117,310 | B2 | 8/2015 | Coene |
| 9,269,153 | B2 | 2/2016 | Gandolph |
| 9,285,951 | B2 | 3/2016 | Makofsky |
| 9,336,610 | B2 | 5/2016 | Ohashi |
| 9,542,626 | B2 | 1/2017 | Martinson |
| 2002/0012072 | A1 | 1/2002 | Toyama |
| 2002/0025066 | A1 | 2/2002 | Pettigrew |
| 2002/0051491 | A1 | 5/2002 | Challapali |
| 2002/0158873 | A1 | 10/2002 | Williamson |
| 2004/0004626 | A1 | 1/2004 | Ida |
| 2004/0153671 | A1 | 8/2004 | Schuyler |
| 2004/0175021 | A1 | 9/2004 | Porter |
| 2005/0063565 | A1 | 3/2005 | Nagaoka |
| 2005/0094879 | A1 | 5/2005 | Harville |
| 2005/0219264 | A1 | 10/2005 | Shum |
| 2005/0219391 | A1 * | 10/2005 | Sun .................. G06T 5/009 348/255 |
| 2005/0262201 | A1 * | 11/2005 | Rudolph ............. H04L 12/1827 709/205 |
| 2006/0072022 | A1 | 4/2006 | Iwai |
| 2006/0193509 | A1 | 8/2006 | Criminisi |
| 2006/0221248 | A1 | 10/2006 | McGuire |

(56) References Cited

U.S. PATENT DOCUMENTS

| | | |
|---|---|---|
| 2006/0259552 A1 | 11/2006 | Mock |
| 2006/0291697 A1 | 12/2006 | Luo |
| 2007/0036432 A1 | 2/2007 | Xu |
| 2007/0070200 A1 | 3/2007 | Matusik |
| 2007/0110298 A1 | 5/2007 | Graepel |
| 2007/0133880 A1 | 6/2007 | Sun |
| 2007/0146512 A1 | 6/2007 | Suzuki |
| 2007/0201738 A1 | 8/2007 | Toda |
| 2007/0269108 A1 | 11/2007 | Steinberg |
| 2008/0109724 A1 | 5/2008 | Gallmeier |
| 2008/0181507 A1 | 7/2008 | Gope |
| 2008/0219554 A1 | 9/2008 | Dorai |
| 2008/0266380 A1 | 10/2008 | Gorzynski |
| 2008/0273751 A1 | 11/2008 | Yuan |
| 2009/0003687 A1 | 1/2009 | Agarwal |
| 2009/0044113 A1 | 2/2009 | Jones |
| 2009/0110299 A1 | 4/2009 | Panahpour |
| 2009/0144651 A1 | 6/2009 | Sprang |
| 2009/0199111 A1 | 8/2009 | Emori |
| 2009/0244309 A1 | 10/2009 | Maison |
| 2009/0245571 A1 | 10/2009 | Chien |
| 2009/0249863 A1 | 10/2009 | Kim |
| 2009/0278859 A1 | 11/2009 | Weiss |
| 2009/0284627 A1 | 11/2009 | Bando |
| 2009/0290795 A1 | 11/2009 | Criminisi |
| 2009/0300553 A1 | 12/2009 | Pettigrew |
| 2010/0027961 A1 | 2/2010 | Gentile |
| 2010/0034457 A1 | 2/2010 | Berliner |
| 2010/0046830 A1 | 2/2010 | Wang |
| 2010/0053212 A1 | 3/2010 | Kang |
| 2010/0128927 A1 | 5/2010 | Ikenoue |
| 2010/0166325 A1 | 7/2010 | Sengamedu |
| 2010/0171807 A1 | 7/2010 | Tysso |
| 2010/0195898 A1 | 8/2010 | Bang |
| 2010/0278384 A1 | 11/2010 | Shotton |
| 2010/0302376 A1 | 12/2010 | Boulanger |
| 2010/0302395 A1 | 12/2010 | Mathe |
| 2010/0329544 A1 | 12/2010 | Sabe |
| 2011/0007183 A1* | 1/2011 | Kahlman ............... G06T 5/002 348/229.1 |
| 2011/0038536 A1 | 2/2011 | Gong |
| 2011/0090311 A1* | 4/2011 | Fang .................... H04N 7/15 348/43 |
| 2011/0115886 A1 | 5/2011 | Nguyen |
| 2011/0158529 A1 | 6/2011 | Malik |
| 2011/0193939 A1 | 8/2011 | Vassigh |
| 2011/0216965 A1 | 9/2011 | Rother |
| 2011/0216975 A1 | 9/2011 | Rother |
| 2011/0216976 A1 | 9/2011 | Rother |
| 2011/0242277 A1 | 10/2011 | Do |
| 2011/0243430 A1 | 10/2011 | Hung |
| 2011/0249190 A1 | 10/2011 | Nguyen |
| 2011/0249863 A1 | 10/2011 | Ohashi |
| 2011/0249883 A1 | 10/2011 | Can |
| 2011/0267348 A1 | 11/2011 | Lin |
| 2011/0293179 A1 | 12/2011 | Dikmen |
| 2011/0293180 A1 | 12/2011 | Criminisi |
| 2012/0051631 A1 | 3/2012 | Nguyen |
| 2012/0127259 A1* | 5/2012 | Mackie .................... H04N 7/15 348/14.07 |
| 2012/0314077 A1 | 12/2012 | Clavenna, II |
| 2013/0016097 A1 | 1/2013 | Coene |
| 2013/0028476 A1 | 1/2013 | Craig |
| 2013/0094780 A1 | 4/2013 | Tang |
| 2013/0110565 A1* | 5/2013 | Means, Jr. ........... G06Q 10/063 705/7.11 |
| 2013/0129205 A1 | 5/2013 | Wang |
| 2013/0142452 A1 | 6/2013 | Shionozaki |
| 2013/0147900 A1* | 6/2013 | Weiser ................... H04N 7/15 348/14.08 |
| 2013/0243313 A1 | 9/2013 | Civit |
| 2013/0335506 A1 | 12/2013 | Carter |
| 2014/0003719 A1 | 1/2014 | Bai |
| 2014/0029788 A1 | 1/2014 | Kang |
| 2014/0063177 A1 | 3/2014 | Tian |
| 2014/0085398 A1* | 3/2014 | Tian ....................... H04N 7/15 348/14.01 |
| 2014/0112547 A1 | 4/2014 | Peeper |
| 2014/0119642 A1 | 5/2014 | Lee |
| 2014/0153784 A1 | 6/2014 | Gandolph |
| 2014/0229850 A1 | 8/2014 | Makofsky |
| 2014/0300630 A1 | 10/2014 | Flider |
| 2014/0307056 A1 | 10/2014 | Romea |
| 2017/0208243 A1 | 7/2017 | Masad |

OTHER PUBLICATIONS

Urn, Gi-Mun, et al., "Three-dimensional Scene Reconstruction Using Multi-View Images and Depth Camera", pp. 271-280, SPIE-IS&t, vol. 5664, 2005.

Kolmogorov, et al., "Bi-Layer Segmentation of Binocular Stereo Vision", IEEE, 2005.

Cheung et al., "Robust Techniques for Background Subtraction in Urban Traffice Video", 2004.

Benezeth et al., "Review and Evaluation of Commonly-Implemented Background Subtraction Algorithms", 2008.

Izquierdo' M. Ebroul. "Disparity/segmentation analysis: matching with an adaptive window and depth-driven segmentation." Circuits and Systems for Video Technology, IEEE Transactions on 9.4 (1999): 589-607.

Arbelaez, P., et ,al., "Contour detection and hierarchical image segmentation", Pattern Analysis and Machine Intelligence, IEEE Transactions on 33.4 (2011): 898-916.

Carsten, R., et al., "Grabcut: Interactive foreground extraction using iterated graph cuts", ACM Transactions on Graphics (TOG) 23.3 (2004), pp. 309-314.

Zhang, Q., et al., "Segmentation and tracking multiple objects under occlusion from multiview video.", Image Processing, IEEE Transactions on 20.11 (2011), pp. 3308-3313.

Xu, F., et al., "Human detection using depth and gray images", Advanced Video and Signal Based Surveillance, 2003., Proceedings, IEEE Conference on IEEE, 2003.

Wang, L., et al., "Tofcut: Towards robust real-time foreground extraction using a time-off camera.", Proc. of 3DPVT, 2010.

Zitnick, C. Lawrence, et al., "High-quality video view interpolation using a layered representation," 23(3) Journal ACM Transactions on Graphics (TOG)—Proceedings of ACM SIGGRAPH 2004, pp. 600-608 (Aug. 2004).

Zhang, Buyue, et al., "Adaptive Bilateral Filter for Sharpness Enhancement and Noise Removal," IEEE ICIP, pp. IV-417-IV-420 (2007).

Yang, Qingxiong, et al., "Spatial-Depth Super Resolution for Range Images," IEEE Conference on Computer Vision and Pattern Recognition, pp. 1-8 (2007).

Vazquez, C., et al., "3D-TV: Coding of Disocclusions for 2D+Depth Representation of Multi- View Images," Proceedings of the Tenth IASTED Int'l Conference: Computer Graphics and Imaging, pp. 26-33 (Feb. 13-15, 2008).

Tomasi, C., et al., "Bilateral Filtering for Gray and Color Images," Sixth International Conference on Computer Vision, pp. 839-846 (1998).

Shade, Jonathan, et al., "Layered Depth Images," Computer Graphics Proceedings, Annual Conference Series, pp. 231-242 (Jul. 19-24, 1998).

Saxena, Ashutosh, et al., "3-D Depth Reconstruction from a Single Still Image," 76(1) International Journal of Computer Vision 53-69 (2007).

PrimeSense, Home Page, retrieved Oct. 21, 2010, from http://www.primesense.com, 1 page.

Nguyen, Quang H., et al., "Depth Image-Based Rendering with Low Resolution Depth," 16th IEEE International Conference on Image Processing (ICIP), pp. 553-556 (2009).

Nguyen, Quang H., et al., "Depth image-based rendering from multiple cameras with 3D propagation algorithm," Proceedings of the 2nd International Conference on Immersive Telecommunications, 6 pages (2009).

(56) References Cited

OTHER PUBLICATIONS

Nguyen, Ha T., et al., "Image-Based Rendering with Depth Information Using the Propagation Algorithm," Proc. of IEEE International Conference on Acoustics, Speech, and Signal Processing (ICASSP), 4 pages (Mar. 2005).
McMillan, Jr., Leonard, "An Image-Based Approach to Three-Dimensional Computer Graphics," University of North Carolina at Chapel Hill, Chapel Hill, NC, 206 pages (1997).
Mark, William R., et al., "Post-Rendering 3D Warping," In Proceedings of 1997 Symposium on Interactive 3D Graphics, Providence, RI, pp. 7-16 (Apr. 27-30, 1997).
Lee, Eun-Kyung, et al., "High-Resolution Depth Map Generation by Applying Stereo Matching Based on Initial Depth Information," 3DTV-CON'08, Istanbul, Turkey, pp. 201-204 (May 28-30, 2008).
Kubota, Akira, et al., "Multiview Imaging and 3DTV," IEEE Signal Processing Magazine, pp. 10-21 (Nov. 2007).
Kipfer, Peter, "GPU Gems 3—Chapter 33. LCP Algorithms for Collision Detection Using CUDA," retrieved Nov. 17, 2009, from http://http.developer.nvidia.com/ GPUGems3/qpuqems3 ch33.html, 11 pages (2007).
Kao, Wen-Chung, et al., "Multistage Bilateral Noise Filtering and Edge Detection for Color Image Enhancement," 51 (4) IEEE Transactions on Consumer Electronics 1346-1351 (Nov. 2005).
Kanade, Takeo, et al., "Virtualized Reality: Constructing Virtual Worlds from Real Scenes," IEEE MultiMedia, pp. 34-46 (Jan.-Mar. 1997).
Jung, Kwang Hee, et al., "Depth Image Based Rendering for 3D Data Service Over T-DMB," IEEE, 3DTV-CON'08, Istanbul, Turkey, pp. 237-240 (May 28-30, 2008).
Ho, Yo-Sung, et al., "Three-dimensional Video Generation for Realistic Broadcasting Services," ITC-CSCC, pp. TR-1 through TR4 (2008).
GPGPU (General-purpose computing on graphics processing units)—Wikipedia, retrieved Nov. 17, 2009, from http://en.wikipedia.org/wiki/GPGPU, 9 pages.
Fehn, Christoph, et al., "Interactive 3-DTV—Concepts and Key Technologies," 94(3) Proceedings of the IEEE 524-538 (Mar. 2006).
Debevec, Paul, et al., "Efficient View-Dependent Image-Based Rendering with Projective Texture-Mapping," In 9th Eurographics Workshop on Rendering, pp. 105-116 (Jun. 1998).
Chen, Wan-Yu, et al., "Efficient Depth Image Based Rendering with Edge Dependent Depth Filter and Interpolation," IEEE International Conference on Multimedia and Expo, pp. 1314-1317 (Jul. 6, 2005).
Chan, Shing-Chow, et al. "The Plenoptic Video," 15(12) IEEE Transactions on Circuits and Systems for Video Technology 1650-1659 (Dec. 2005).
Chan, S.C., et al., "Image-Based Rendering and Synthesis," IEEE Signal Processing Magazine, pp. 22-31 (Nov. 2007).
Canesta™, "See How Canesta's Solution Gesture Control Will Change the Living Room," retrieved Oct. 21, 2010, from http://canesta.com, 2 pages.
Barnat, Jii'f, et al., "CUDA accelerated LTL Model Checking," FI MU Report Series, FIMU- RS-2009-05, 20 pages (Jun. 2009).
Akbarzadeh, A., et al., "Towards Urban 3D Reconstruction From Video," Third International Symposium on 3D Data Processing, Visualization, and Transmission, pp. 1-8 (Jun. 14-16, 2006).
Crabb et al., "Real-Time Foreground Segmentation via Range and Color Imaging", 2008.
Gvili et al., "Depth Keying", 2003.
Piccardi, M., "Background Subtraction Techniques: A Review", IEEE, 2004.
Lee, D.S., "Effective Gaussian Mixture for Video Background Subtraction", IEEE, vol. 27, No. 5, dated May 2005, pp. 827-832.
Lee, D.S., "Effective Gaussian Mixture Learning for Video Background Substraction", IEEE, May 2005.
Working screenshot of Snagit manufactured by Techsmith, released Apr. 18, 2014.
H. Y. Shum and S. B. Kang, "A Review of Image-based Rendering Techniques," Proc. IEEE/SPIE Visual Communications and Image (VCIP) 2000, pp. 2-13, Perth, Jun. 2000.
Yacoob, Y., et al., "Detection, analysis and matching of hair," in Computer Vision, 2005, ICCV 2005. Tenth IEEE International Conference, vol. 1, No., pp. 741-748, vol. 1, Oct. 17-21, 2005.
Talukder, A., et al., "Real-time detection of moving objects in a dynamic scene from moving robotic vehicles," in Intelligent Robots and Systems, 2003. (IROS 2003). Proceedings. 2003 IEEE/RSJ international Conference on, vol. 2, pp. 1308-1313, vol. 2, Oct. 27-31, 2003.
Sheasby, G., et al., "A robust stereo prior for human segmentation", In ACCV, 2012.
Hradis, M., et al., "Real-time Tracking of Participants in Meeting Video", Proceedings of CESCG, Wien, 2006.

\* cited by examiner

SYSTEMS AND METHODS FOR ITERATIVE ADJUSTMENT OF VIDEO-CAPTURE SETTINGS BASED ON IDENTIFIED PERSONA

CROSS REFERENCE TO RELATED APPLICATIONS

This application is a continuation of U.S. application Ser. No. 14/145,880, filed Dec. 31, 2013 and issued Nov. 1, 2016 as U.S. Pat. No. 9,485,433, entitled "SYSTEMS AND METHODS FOR ITERATIVE ADJUSTMENT OF VIDEO-CAPTURE SETTINGS BASED ON IDENTIFIED PERSONA," which is hereby incorporated herein by reference in its entirety.

BACKGROUND

Online data communications are quite prevalent and pervasive in modern society, and are becoming more so all the time. Moreover, developments in software, communication protocols, and peripheral devices (e.g., video cameras), along with developments in other computing disciplines, have collectively enabled and facilitated the inclusion of multimedia experiences as part of such communications. Indeed, the multimedia nature and aspects of a given communication session are often the focus and even essence of such communications. These multimedia experiences take forms such as audio chats, video chats (that are usually also audio chats), online meetings (e.g., web meetings), and the like.

Using the context of online meetings as an illustrative example, it is often the case that one of the participants is the designated presenter, and often this designated presenter opts to include some visual materials as part of the offered presentation. Such visual materials may take the form of or at least include visual aids such as shared desktops, multiple-slide presentations, and the like. In some instances, from the perspective of another attendee at the online meeting, only such visual materials are presented on the display of the online meeting, while the presenter participates only as an audio voiceover. In other instances, the presenter may be shown in one region of the display while the visual materials are shown in another. And other similar examples exist as well.

OVERVIEW

Improvements over the above-described options have recently been realized by technology that, among other capabilities and features, extracts what is known as a "persona" of the presenter from a video feed from a video camera that is capturing video of the presenter. The extracted persona, which in some examples appears as a depiction of the presenter from the torso up (i.e., upper torso, shoulders, arms, hands, neck, and head), and in other examples appears as the entire body from head to foot, is then visually combined by this technology with content such as a multiple-slide presentation, such that the presenter appears to the attendees at the online meeting to be superimposed over the content, thus personalizing and otherwise enhancing the attendees' experiences. This technology is described in the following patent documents, each of which is incorporated in its respective entirety into this disclosure: (i) U.S. patent application Ser. No. 13/083,470, entitled "Systems and Methods for Accurate User Foreground Video Extraction," filed Apr. 8, 2011 and published Oct. 13, 2011 as U.S. Patent Application Pub. No. US2011/0249190, (ii) U.S. patent application Ser. No. 13/076,264, entitled "Systems and Methods for Embedding a Foreground Video into a Background Feed based on a Control Input," filed Mar. 30, 2011 and published Oct. 6, 2011 as U.S. Patent Application Pub. No. US2011/0242277, and (iii) unpublished U.S. Patent Application entitled "System and Methods for Persona Identification Using Combined Probability Maps," filed Dec. 31, 2013 and having U.S. application Ser. No. 14/145,874.

As mentioned, this persona extraction is carried out with respect to video data that is being received from a camera that is capturing video of a scene in which the presenter is positioned. The persona-extraction technology substantially continuously (e.g., with respect to each frame) identifies which pixels represent the presenter and which pixels do not, and accordingly generates "alpha masks" (e.g., generates an alpha mask for each frame), where a given alpha mask may take the form of or at least include an array with a respective stored data element corresponding to each pixel in the corresponding frame, where such stored data elements are individually and respectively set equal to 1 (one) for each presenter pixel and to 0 (zero) for every other pixel (i.e., for each non-presenter (a.k.a. background) pixel).

The described alpha masks correspond in name with the definition of the "A" in the "RGBA" pixel-data format known to those of skill in the art, where "R" is a red-color value, "G" is a green-color value, "B" is a blue-color value, and "A" is an alpha value ranging from 0 (complete transparency) to 1 (complete opacity). In a typical implementation, the "0" in the previous sentence may take the form of a hexadecimal number such as 0x00 (equal to a decimal value of 0 (zero)), while the "1" may take the form of a hexadecimal number such as 0xFF (equal to a decimal value of 255); that is, a given alpha value may be expressed as an 8-bit number that can be set equal to any integer that is (i) greater than or equal to zero and (ii) less than or equal to 255. Moreover, a typical RGBA implementation provides for such an 8-bit alpha number for each of what are known as the red channel, the green channel, and the blue channel; as such, each pixel has (i) a red ("R") color value whose corresponding transparency value can be set to any integer value between 0x00 and 0xFF, (ii) a green ("G") color value whose corresponding transparency value can be set to any integer value between 0x00 and 0xFF, and (iii) a blue ("B") color value whose corresponding transparency value can be set to any integer value between 0x00 and 0xFF. And certainly other pixel-data formats could be used, as deemed suitable by those having skill in the relevant art for a given implementation.

When merging an extracted persona with content, the above-referenced persona-extraction technology creates the above-mentioned merged display in a manner consistent with these conventions; in particular, on a pixel-by-pixel (i.e., pixel-wise) basis, the merging is carried out using pixels from the captured video frame for which the corresponding alpha-mask values equal 1, and otherwise using pixels from the content. Moreover, it is noted that pixel data structures typically also include or are otherwise associated with one or more other values corresponding respectively to one or more other properties of the pixel, where brightness is an example of one such property. In some embodiments, the brightness value is the luma component of the image or video frame. In other embodiments the brightness value may be the pixel values of one of an R, G, or B color channel, or other similar color space (e.g., gamma compressed RGB, or R'G'B', or YUV, or YCbCr, as examples). In other embodiments, the brightness value may be a weighted average of pixel values from one or more color channels.

Furthermore, a given video camera typically has one or more adjustable video-capture settings that affect the characteristics of the pixels that are stored by the video camera for various video frames. Two common examples of such settings are exposure and gain. In the context of a given pixel, exposure refers in general to the amount of light that is captured by (i.e., let into) the pixel, and is dependent on multiple factors including the duration of time for which the pixel is "left open" to gather light, as well as the nature and dimensions of the opening (i.e., aperture) though which such light is gathered during that time. Gain refers in general to the degree to which the signal that is received in connection with a given pixel is amplified, and often has both analog and digital stages, referred to respectively in the art as analog gain and digital gain. And certainly there are many other adjustable video-capture settings that could be listed here, as exposure and gain are but two examples. Moreover, the definitions that are provided in this disclosure in connection with these and other video-capture and video-processing settings are meant to aid and guide the reader, and are not meant to exclude all or part of any respective definitions that are attributed to such terms and their equivalents by those having ordinary skill in the relevant art.

This disclosure describes systems and methods for iterative adjustment of video-capture settings based on identified persona. As described, in an example, a video camera is capturing video frames that are each made up of two mutually-exclusive sets of pixels: (1) the pixels that are identified as being part of an identified and later extracted persona in the frame, and that are referred to at times herein as persona pixels, and (2) all other pixels in the frame, which are referred to at times herein as non-persona pixels, background pixels, and the like. The present systems and methods use the persona pixels—and not the non-persona pixels—as the basis for adjusting one or more adjustable video-capture settings of the video camera as it continues to capture additional frames that also include the persona. This pixel selectivity enhances what is known in the art as the dynamic range of the persona that is extracted from the video and later merged with content as described above. Because the non-persona pixels are discarded by the time the persona has been merged with the content anyway, deeming them irrelevant to the video-capture settings of the video camera is commensurate with their irrelevance to the merged persona-and-content result that is displayed to end users.

One embodiment takes the form of a method that includes receiving frames of video data that are being captured by a video camera and that are representative of an ongoing scene, where the video camera has one or more adjustable video-capture settings. The method also includes identifying a persona in one or more of the received frames at least in part by identifying, in each such frame, a set of pixels that is representative of the persona in the frame and that does not include any pixels representative of the background of the frame. The method also includes selecting, based collectively on the brightness values of the pixels in the identified set of pixels of one or more respective frames, a respective adjustment command for one or more of the adjustable video-capture settings. The method also includes outputting the selected adjustment commands to the video camera for use by the video camera in continuing to capture video data representative of the ongoing scene.

Another embodiment takes the form of a video-capture controller that includes various modules configured to carry out the various functions described in the preceding paragraph. In the embodiment, the video-capture controller includes a frame-receiving module configured to carry out the receiving function, a persona-identification module configured to carry out the identifying function, a video-capture-adjustment module configured to carry out the selecting function, and a command-output module configured to carry out the outputting function.

The preceding paragraph is an example of the fact that, in the present disclosure, various elements of one or more of the described embodiments are referred to as modules that carry out (i.e., perform, execute, and the like) various functions described herein. As the term "module" is used herein, each described module includes or at least has access to any necessary hardware (e.g., one or more processors, microprocessors, microcontrollers, microchips, application-specific integrated circuits (ASICs), field programmable gate arrays (FPGAs), memory devices, and/or one or more of any other type or types of devices and/or components deemed suitable by those of skill in the relevant art in a given context and/or for a given implementation. Each described module also includes or at least has access to any necessary instructions executable for carrying out the one or more functions described as being carried out by the particular module, where those instructions could take the form of or at least include hardware (i.e., hardwired) instructions, firmware instructions, software instructions, and/or the like, stored in any non-transitory computer-readable medium deemed suitable by those of skill in the relevant art.

In at least one embodiment, identifying, in a given frame, the set of pixels that is representative of the persona in the given frame and that does not include any pixels representative of the background of the given frame involves (i) obtaining a binary alpha mask for the given frame, where the binary alpha mask has (a) a first data value (e.g., 1 (one)) associated with each pixel that is representative of the persona and (b) a second (i.e., different) data value (e.g., 0 (zero)) associated with each pixel that is in the given frame but that is not representative of the persona and (ii) configuring the identified set of pixels for the given frame to include only those pixels that are associated with the first data value in the corresponding binary alpha mask. In at least one such embodiment, obtaining the binary alpha mask for the given frame involves generating the binary alpha mask by processing image-depth data of the given frame. In at least one other such embodiment, obtaining the binary alpha mask for the given frame involves receiving the binary alpha mask from a video processor that generated the alpha mask by processing image-depth data of the given frame.

In at least one embodiment, selecting, based collectively on the brightness values of the pixels in the identified set of pixels of one or more respective frames, a respective adjustment command for one or more of the adjustable video-capture settings involves (i) generating a statistical model reflecting a distribution of those brightness values along a brightness spectrum and (ii) selecting a respective adjustment command for one or more of the adjustable video-capture settings based at least in part on the statistical model. In at least one such embodiment, the statistical model includes a histogram. In at least one other such embodiment, identifying, in a given frame, the set of pixels that is representative of the persona in the given frame and that does not include any pixels representative of the background of the given frame involves (i) generating a binary alpha mask for the given frame by processing image-depth data of the given frame, where the binary alpha mask has (a) a first data value (e.g., 1 (one)) associated with each pixel that is representative of the persona and (b) a second (i.e., different) data value (e.g., 0 (zero)) associated with each pixel that is in the given frame but that is not representative of the persona and (ii) configuring the identified set of pixels for the given frame to include only those pixels that are associated with the first data value in the corresponding binary alpha mask.

In at least one embodiment, the adjustable video-capture settings include one or more of exposure, aperture, shutter speed, frame rate, gain, analog gain, digital gain, zoom, optical zoom, and digital zoom.

In at least one embodiment, the method further includes selecting, based at least in part on the pixels in the identified set, a respective adjustment command for one or more video-processing settings. In at least one such embodiment, the video-processing settings include one or more of white balance, contrast, gain, vibrance, hue, saturation, color temperature, and sharpness.

In at least one embodiment, the video camera has an associated application programming interface (API), and selecting one or more of the adjustment commands involves selecting one or more of the adjustment commands from the API.

In at least one embodiment, at least one of the selected adjustment commands specifies a particular value for the corresponding adjustable video-capture setting.

In at least one embodiment, at least one of the selected adjustment commands specifies a relative change to the corresponding adjustable video-capture setting.

Another embodiment takes the form of a method that includes receiving a video-frame sequence being captured by a video camera, receiving a sequence of image-depth data corresponding to the video-frame sequence, and generating a series of persona alpha masks by processing the video-frame sequence and the sequence of image-depth data. The method also includes generating a sequence of histograms based on the video-frame sequence and the sequence of persona alpha masks, selecting video-capture adjustments based on the histograms, and transmitting the video-capture adjustments to the video camera for adjusting the continued capturing of the video-frame sequence.

In at least one embodiment, the persona alpha masks are binary in that each persona alpha mask has (i) a first data value (e.g., 1 (one)) associated with each pixel in the corresponding frame that is representative of the persona and (ii) a second data value (e.g., 0 (zero)) associated with each pixel that is in the corresponding frame but that is not representative of the persona. In at least one embodiment, the histograms reflect distributions along a brightness spectrum of pixels from the video-frame sequence that match corresponding persona alpha masks. In at least one embodiment, selecting video-capture adjustments based on the brightness-distribution data models involves time filtering the brightness-distribution data models to select video-capture adjustments that gradually adjust one or more video-capture settings of the video camera. In at least one embodiment, the video-capture adjustments pertain to one or both of exposure and gain.

The above overview is provided by way of example and not limitation, as those having ordinary skill in the relevant art may well implement the disclosed systems and methods using one or more equivalent components, structures, devices, and the like, and may combine and/or distribute certain functions in equivalent though different ways, without departing from the scope and spirit of this disclosure.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION

Figure 1:
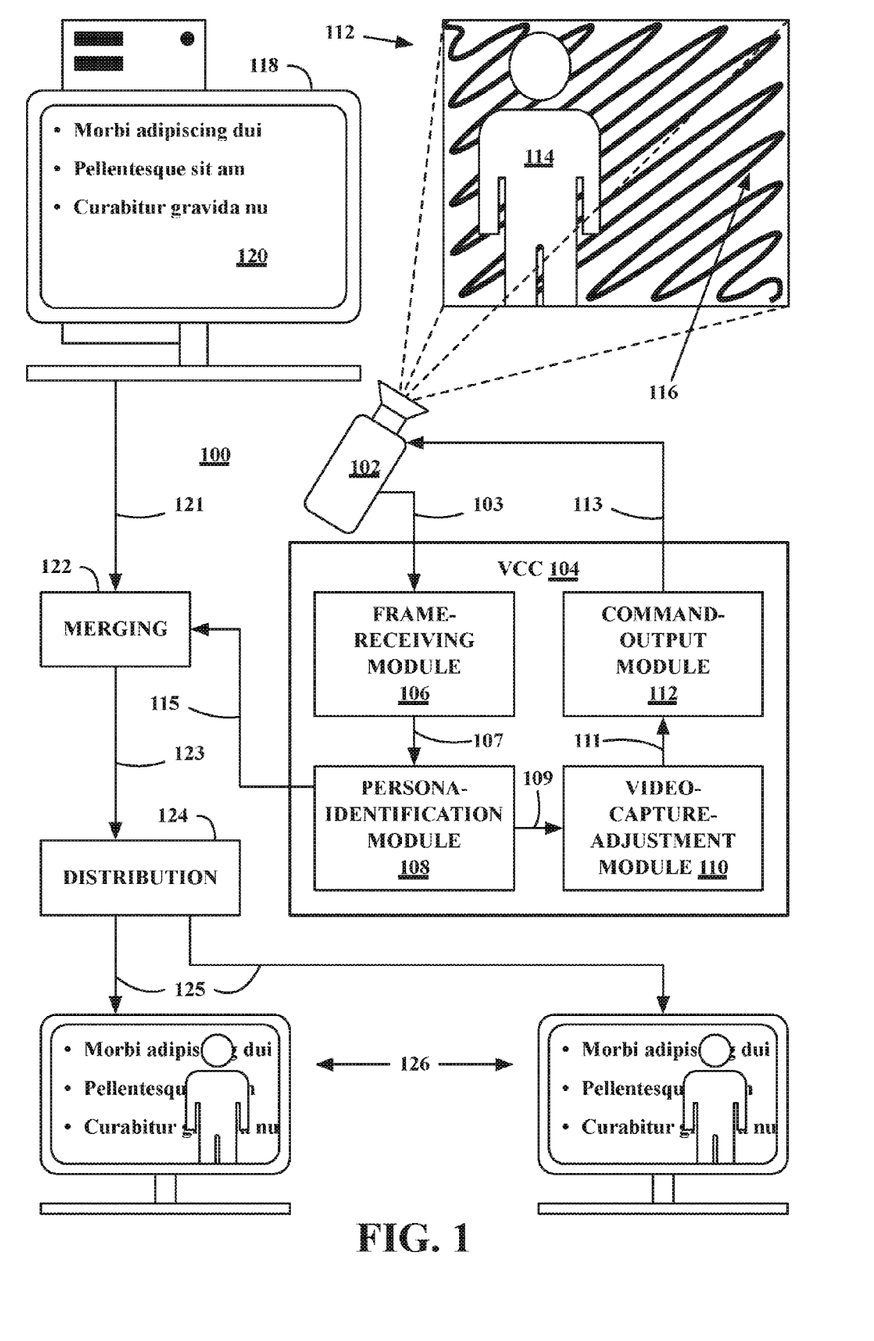
FIG. 1 depicts an example video system in which at least one embodiment can be carried out.

FIG. 1 depicts an example video system 100 that includes a video camera 102 and a video-capture controller (VCC) 104.

The video camera 102 may include any combination of hardware and executable instructions (e.g., executable software instructions) capable of performing the video-camera functions described herein. In an embodiment, the video camera 102 is configured to capture one or more frames of video data that are representative of an ongoing scene 112. The video camera 102 has one or more adjustable video-capture settings that control various aspects and properties of the video camera 102 and of the video data captured thereby. An example arrangement of video camera 102 is described below with reference to FIG. 2.

The VCC 104 may include any combination of hardware and executable instructions (e.g., executable software instructions) capable of performing the VCC functions described herein. In an embodiment, as depicted in FIG. 1, the VCC 104 includes a frame-receiving module 106, a persona-identification module 108, a video-capture-adjustment module 110, and a command-output module 112. In an embodiment, the frame-receiving module 106 is configured to carry out the functions described below in connection with step 402 of FIG. 4. In an embodiment, the persona-identification module 108 is configured to carry out the functions described below in connection with step 404 of FIG. 4. In an embodiment, the video-capture-adjustment module 110 is configured to carry out the functions described below in connection with step 406 of FIG. 4. In an embodiment, the command-output module 112 is configured to carry out the functions described below in connection with step 408 of FIG. 4.

As depicted in the example configuration of FIG. 1, the video camera 102 communicates with the VCC 104 (and in particular with the frame-receiving module 106) as shown generally at 103, the frame-receiving module 106 communicates with the persona-identification module 108 as shown generally at 107, the persona-identification module 108 communicates with the video-capture-adjustment module 110 as shown generally at 109, the video-capture adjustment module 110 communicates with the command-output module 112 as shown generally at 111, and the VCC 104 (and in particular the command-output module 112) communicates with the video camera 102 as shown generally at 113. Those having skill in the art will appreciate that the VCC 104 may include additional and/or different modules, that the modules 106, 108, 110, and 112 may perform additional and/or different functions, and/or additional and/or different communication paths and links could be implemented, as the arrangement described herein is provided by way of example and not limitation.

In various embodiments, the video system 100 also includes a video processor capable of performing the video-processing functions described herein. In at least one embodiment, the video processor has one or more adjustable video-processing settings that control various aspects and properties of the video processor. The video processor may take the form of or at least include any combination of hardware and/or software incorporated into the video camera 102, the VCC 104, and/or any other component of the video system 100 regardless of whether such component is depicted in FIG. 1.

In the example that is depicted in FIG. 1, the video system 100 further includes a computing device 118 that conveys content data 120 (e.g., a multiple-slide presentation) to a merging system 122, as shown generally at 121. In an example configuration, the computing device 118 is or at least includes a computer (e.g., a laptop computer) that is being used by a presenter whose persona 114 is identified and extracted (to the exclusion of the background 116) from video of the scene 112 by the video system 100. In various different examples, the video camera 102 may be a peripheral device of the computing system 118 (e.g., an installed video camera, a video camera connected to the computing system 118 via a Universal Serial Bus (USB) connection, or the like).

The merging system 122 is configured and programmed to carry out the functions described above and elsewhere herein in connection with merging the persona 114 with the content 120 to produce merged content, and further to convey (i.e., send, transmit, and the like, shown generally at 123) the merged content to a distribution system 124 (along with corresponding audio data, metadata, and/or any other data necessary or otherwise useful or helpful in properly presenting the merged content on end-user devices).

The distribution system 124 is configured and programmed to, perhaps among other functions, then convey (as shown generally at 125) the merged content (received from the merging system 122) for presentation of the merged content on an arbitrary number of end-user devices (shown generally at 126). In various different example arrangements, the distribution system 124 is or at least includes a platform that provides online-meeting services generally, with some representative and non-limiting examples being (1) the GoToMeeting® service provided by Citrix Systems, Inc. of Santa Clara, Calif. and (2) the WebEx® service provided by Cisco Systems, Inc. of San Jose, Calif., just to name a few. In some example arrangements, the merging system 122 and the distribution system 124 each have a structure and arrangement similar to that of the computing system that is described below in connection with FIG. 3. In some cases, a single server or server system (having such a structure and arrangement) includes both the merging system 122 and the distribution system 124. And certainly other architectures could be selected by those of skill in the art.

Figure 2:
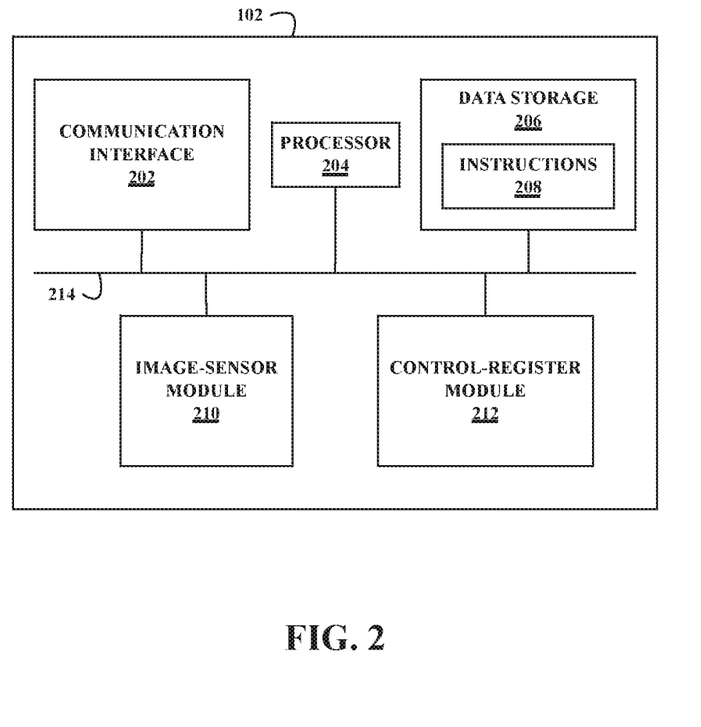
FIG. 2 depicts an example video camera in the context of the example video system of FIG. 1.

FIG. 2 depicts an example structure and arrangement of the video camera 102 of FIG. 1. As described above, the video camera 102 could be a standalone device, but could also be a peripheral device of another device (e.g., a computer), among many other possibilities. In the example that is presented in FIG. 2, the video camera 102 includes a communication interface 202, a processor 204, a data storage 206 having instructions 208, an image-sensor module 210, and a control-register module 212, each of which are interconnected via a system bus, network, or other suitable communication mechanism 214. This architecture is provided for illustration and by way of example, not limitation.

The communication interface 202 may include any number of wired-communication interfaces (e.g., USB, Ethernet, and/or the like) and/or wireless-communication interfaces (e.g., cellular, Wi-Fi, Bluetooth, RF, infrared, and/or the like) for engaging in wired or wireless communication, respectively. The processor 204 may include one or more processors of any types deemed suitable by those of skill in the relevant art, with some representative examples including microprocessors, central processing units (CPUs), digital signal processors (DSPs), image signal processors (ISPs), and the like. The data storage 206 may include one or more instances of one or more types of non-transitory data storage deemed suitable by those having skill in the relevant art, with some representative examples including read-only memory (ROM), random-access memory (RAM), disk-based storage, flash memory, optical-storage technology, and the like. In at least one embodiment, the data storage 206 contains the program instructions 208 that are executable by the processor 204 for carrying out at least the video-camera functions described herein.

The image-sensor module 210 may be or include any combination of hardware and executable instructions (e.g., executable software instructions) capable of and configured for performing the image-sensor-module functions described herein. In an embodiment, the image-sensor module 210 includes a hardware image sensor configured to convert an optical image into an electronic signal. In an embodiment, the hardware image sensor takes the form of (or includes) a charge-coupled device (CCD) sensor, which itself includes an array of light-sensitive cells that each correspond to a respective pixel of a frame captured by the video camera 102. Light that strikes a respective cell in the CCD sensor is held as a small electrical charge that is then transferred through one or more output nodes to be converted to a voltage that represents the amount of light captured by the respective cell. These voltage signals are then typically sent to another component external to the sensor for analog-to-digital conversion. The CCD sensor may take other forms as well.

In an embodiment, the hardware image sensor takes the form of (or includes) a metal-oxide-semiconductor (CMOS) sensor. Similar to the CCD sensor, the CMOS sensor contains an array of light-sensitive cells that each correspond to a respective pixel of a frame captured by the video camera 102, and light that strikes a respective cell in the CCD sensor is held as a small electrical charge. However, the CMOS sensor differs from the CCD sensor in that, unlike the electrical charges of the respective cells of the CCD sensor that are transferred through one or a limited number of output nodes for conversion to respective voltage signals, the electrical charges of the respective cells of the CMOS sensor are converted to voltages by the respective cells. The CMOS sensor may take other forms as well. Those having skill in the art will appreciate that the image-sensor module 210 may take other forms as well without departing from the scope and spirit of this disclosure.

The control-register module 212 may be or include any combination of hardware and executable instructions (e.g., executable software instructions) capable of and configured for performing the control-register-module functions described herein. In an embodiment, the control-register module 212 includes one or more hardware registers (having associated hardware register addresses) that are associated with respective adjustable video-capture settings of the video camera 102. As a general matter, the processor 204 may control various settings (including various adjustable video-capture settings) of the video camera 102 by (1) writing values to various registers of the control-register module 212 at various times via the system bus 214 in order to maintain or change the state of various settings and (2) reading values from various registers of the control-register module 212 at various times to effect (i.e., enforce, implement, operate according to, and the like) the current values of various settings. As is known in the art, such writing and reading operations would typically be carried out according to a clock cycle by which the various communications and operations of the various components of the video camera 102 are coordinated.

In an embodiment, each register has a hardware address that consists of a first number of bits (e.g., 8 bits) and each instance of register data (i.e., each register-data value) consists of second number of bits (e.g., 16 bits). Accordingly, in an embodiment where the system bus 214 is 8 bits (1 byte) wide, one 8-bit register-address transfer and two 8-bit register-data transfers are required when writing data to or reading data from a register at a given address. In this example embodiment, a write operation (a.k.a. sequence) begins with the processor 204—perhaps acting in response to control communication received by the video camera 102 via the communication interface 202 from, e.g., the VCC 104—sending a write-start command (e.g., a write-start bit) to the control-register module 212, which then responds with an acknowledgement. Thereafter, the processor 204 sends an 8-bit register address and a 16-bit register-data value (as two 8-bit register-data transfers) (as well, perhaps, as a write-stop indicator (e.g., a write-stop bit)) to the control-register module 212, which accordingly writes the provided register-data value to the specified register address. Similarly, in this example embodiment, a read operation (a.k.a. sequence) begins with the processor 204 sending a read-start command (e.g., a read-start bit) to the control-register module 212, which then responds with an acknowledgement. Thereafter, the processor 204 sends an 8-bit register address to the control-register module 212, which responds by sending the register-data value (as two 8-bit transfers) from the specified register address to the processor 204, perhaps followed by a read-stop indicator (e.g., a read-stop bit). And certainly other approaches could be implemented by those of skill in the art in various different contexts.

As mentioned above, the video camera 102 has one or more adjustable video-capture settings. Some representative example adjustable video-capture settings include an exposure (the quantity of light reaching the image-sensor module 210), an aperture (the size, nature, and dimensions of the opening through which light travels to the image-sensor module 210), a shutter speed (the length of time for which a shutter of the video camera 102 is open while the image-sensor module 210 is capturing a frame), a frame rate (the rate at which the video camera 102 (e.g., the processor 204) reads entire pixel arrays (i.e., frames) from the image-sensor module 210), an analog gain (the increasing or amplification of the electrical charge of a respective cell prior to analog-to-digital conversion), a digital gain (the increasing of a pixel value after analog-to-digital conversion), an optical zoom (the focal length of a lens of the video camera 102), and a digital zoom (a cropped area of a frame captured by the video camera 102 being stored for display as having increased dimensions (and thus decreased resolution) as compared with that same area in the larger context of the entire frame). And certainly many other adjustable video-capture settings could be listed here, as the preceding list is provided by way of example and not limitation.

In some instances, one or more of the adjustable video-capture settings as they are described in this disclosure will be labeled (i.e., named) differently and/or will be realized as a combination of multiple other (e.g., lower-level) settings; for example, an adjustable exposure setting may be realized as a combination of one or more of shutter speed, aperture, and frame rate being themselves adjustable. And certainly other examples could be provided, as known to those of skill in the art. An extension of this concept (i.e., the abstracting of multiple (e.g., lower-level) commands or settings into one or more (e.g., higher-level) commands or settings) that is known to those of skill in the art is known as an API, and is discussed below.

In an embodiment, one or more of the adjustable video-capture settings of the video camera 102 are adjustable via an API associated with the video camera 102. As a general matter, an API is a set of routines (i.e., function calls, and the like) that may be used by an application to carry out lower-level functions of, in this case, the video camera 102. Different APIs may expose respectively different lower-level functions in the form of different provided routines. For example, some APIs allow changing a setting to a particular specified value, while other APIs allow changing a setting in a relative manner (e.g., increase, decrease, up, down, greater, smaller, etc.) A relative-change option could allow specification of the amount by which to change the value of the setting (e.g., increase by 5, down by 0.04), or may only allow specification of the relative direction of the change, among other possible implementations. Some APIs allow selection among a pre-defined collection of values for groups of respective settings: for example, a respective API may allow for selection of a camera-operation mode (e.g., portrait mode, macro mode, sports mode, night mode, or the like) in which a plurality of settings (e.g., an aperture, frame rate, and/or gain) are set to respective values associated with the respective mode. Some APIs may allow adjustment of values for specific registers in a corresponding control-register module. Those having skill in the art will recognize that APIs take other forms as well.

In addition to the one or more adjustable video-capture settings, one or more post-processing (aka video-processing) functions may be performed by the VCC 104 and/or one or more other processing entities. Such functions may be associated and/or controlled by one or more adjustable video-processing settings, with some representative examples including a white balance (global adjustment of the intensities of the colors to render neutral tones accurately), a contrast (ratio of the luminance of the brightest color in a frame to that of the darkest color), a gain, a vibrance (saturation of lower-saturated colors), a hue (similarity to or difference from references such as standard red, green, blue, and yellow), a saturation (a difference between a color and gray relative to the brightness of the color), a color temperature (the temperature of an ideal black body radiator that radiates light of comparable hue to that of the light source), and/or sharpness (e.g., edge contrast). And certainly many other adjustable video-processing (a.k.a. post-processing or video post-processing) settings could be listed here, as the preceding list is provided by way of example and not limitation.

Figure 3:
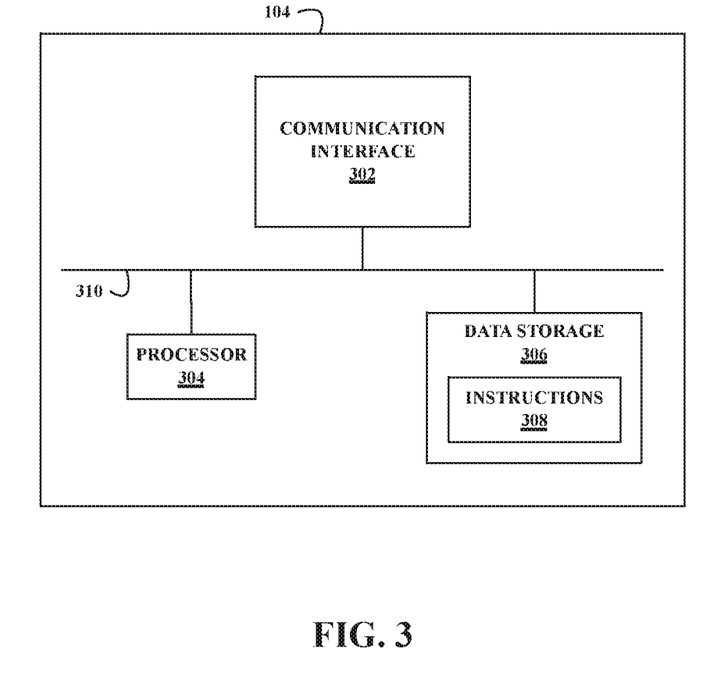
FIG. 3 depicts an example video-capture controller in the context of the example video system of FIG. 1, in accordance with at least one embodiment.

FIG. 3 depicts an example computing system, and in particular depicts an example structure of the VCC 104 as including a communication interface 302, a processor 304, and a data storage 306 having instructions 308, each of which are interconnected via a system bus, network, or other suitable communication mechanism 310. The communication interface 302, the processor 304, the data storage 306, the instructions 308 (as to form as opposed to content), and/or the system bus 310 may take a form similar (or identical) to the correspondingly named and numbered component described in connection with FIG. 2, and therefore are not described in as great of detail here. VCC 104 could be incorporated into one or more of the video camera 102, the computing device 118, any other device or component, and/or any combination of these as deemed suitable by those of skill in the relevant art.

Figure 4:
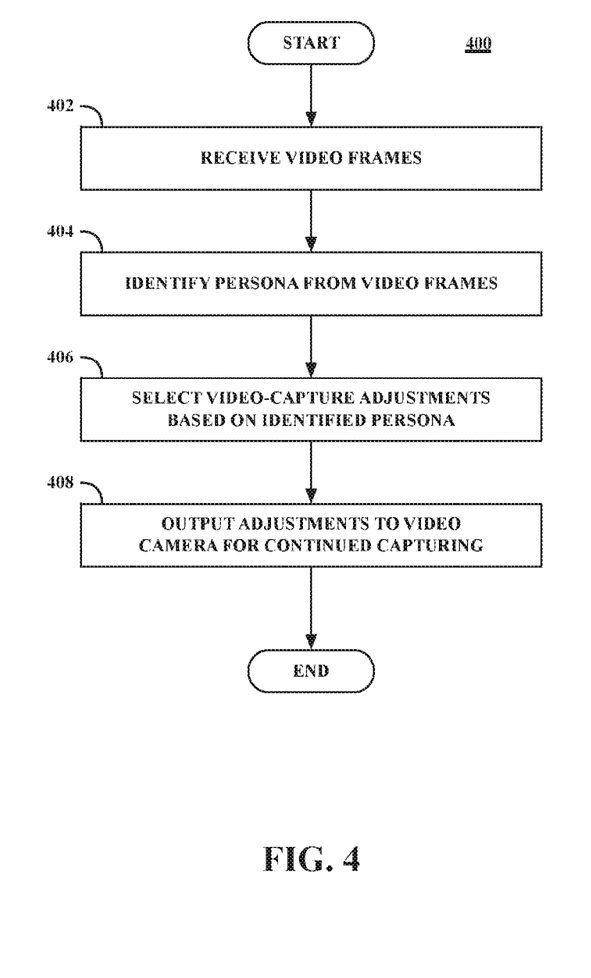
FIG. 4 depicts a first example method in accordance with at least one embodiment.

FIG. 4 depicts a first example method. In particular, FIG. 4 depicts an example method 400 that in at least one embodiment is performed by the VCC 104. The method begins at step 402, with the VCC 104 receiving frames of video data that are being captured by the video camera 102 and that are representative of the ongoing scene 112. As described above, the video camera 102 has one or more adjustable video-capture settings. In at least one embodiment, the one or more adjustable video-capture settings include one or more of exposure, aperture, shutter speed, frame rate, gain, analog gain, digital gain, zoom, optical zoom, and digital zoom.

At step 404, the VCC 104 identifies the persona 114 in one or more of the received frames at least in part by identifying, in each such frame, a set of pixels that is representative of the persona 114 in the frame and that does not include any pixels representative of the background 116 of the frame. In general, the captured video comprises a background portion and a foreground portion, where the background portion may comprise a wall, outdoor scene, or any other background scene and the foreground portion may comprise a human user or presenter. Persona identification is performed to identify the foreground portion such that the user image may be extracted and displayed without the background pixel data. In some embodiments, the persona-identification module 108 may be used to analyze (i) depth information, (ii) image pixel information, or both, to generate a plurality of foreground-background probability maps. The maps may then be aggregated into a single probability map that is then processed by the persona-identification module 108, which may utilize a graph cut algorithm, an active-contour algorithm, an active shape algorithm, or a combination thereof, to identify the pixels of an image frame that correspond to a user persona. The above documents that are incorporated by reference provide additional examples of persona extraction.

In at least one embodiment, step 404 involves (i) obtaining a binary alpha mask for the given frame, where the binary alpha mask has (a) a first data value (e.g., 1 (one)) associated with each pixel that is representative of the persona and (b) a second, different, data value (e.g., 0 (zero)) associated with each pixel that is in the given frame but that is not representative of the persona and (ii) configuring the identified set of pixels for the given frame to include only those pixels that are associated with the first data value in the corresponding binary alpha mask. In at least one such embodiment, step 404 involves generating the binary alpha mask by processing image-depth data of the given frame; in at least one other such embodiment, step 404 involves receiving the binary alpha mask from a video processor that generated the mask by processing image-depth data of the given frame.

At step 406, the VCC 104 selects, based collectively on the brightness values of the pixels in the identified set of pixels of one or more respective frames, a respective adjustment command for one or more of the adjustable video-capture settings of the video camera 102. In at least one embodiment, step 406 involves (i) generating a statistical model (e.g., a histogram) reflecting a distribution of those brightness values along a brightness spectrum and (ii) selecting a respective adjustment command for one or more of the adjustable video-capture settings based at least in part on the statistical model.

At step 408, the VCC 104 outputs the adjustment commands (that were selected at step 406) to the video camera 102 for use by the video camera 102 in continuing to capture video data representative of the ongoing scene 112. In at least one embodiment, step 408 involves selecting one or more of the adjustment commands from an API associated with the video camera 102. In at least one embodiment, at least one of the selected adjustment commands specifies a particular value for the corresponding adjustable video-capture setting. In at least one embodiment, at least one of the selected adjustment commands specifies a relative change to the corresponding adjustable video-capture setting.

In at least one embodiment, the VCC 104 and/or another entity also selects, based at least in part on the pixels in the identified set, a respective adjustment command for one or more video-processing settings. In at least one such embodiment, the one or more video-processing settings include one or more of white balance, contrast, gain, vibrance, hue, saturation, color temperature, and sharpness.

Figure 5:
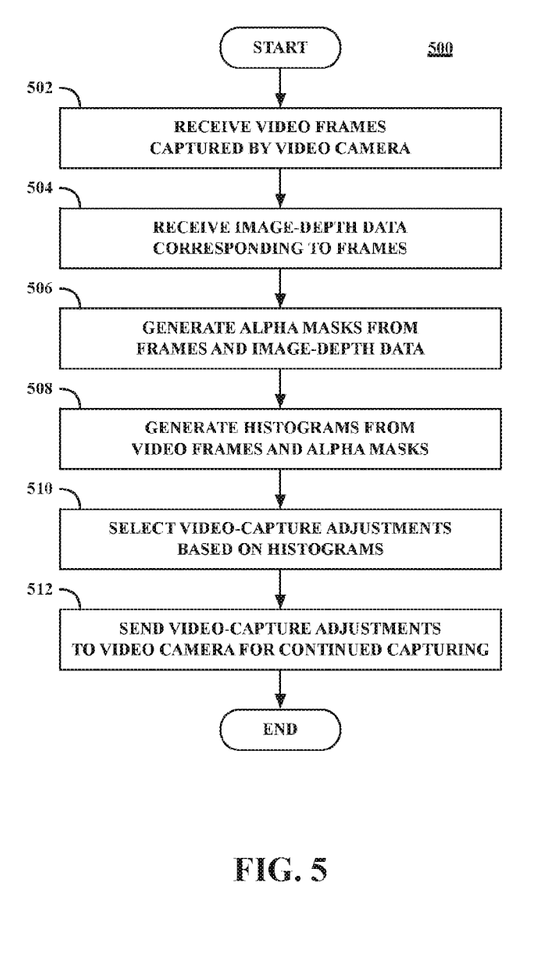
FIG. 5 depicts a second example method in accordance with at least one embodiment.

FIG. 5 depicts a second example method. In particular, FIG. 5 depicts a method 500 that in at least one embodiment is carried out by a computing system having a structure similar to that described in connection with FIG. 3 with respect to the VCC 104. As a general matter, the method 500 of FIG. 5 is similar in various respects to the method 400 of FIG. 4, and is therefore not described in as great of detail.

At step 502, the computing system receives a video-frame sequence being captured by a video camera such as the video camera 102.

At step 504, the computing system receives a sequence of image-depth data corresponding to the video-frame sequence that was received at step 502.

At step 506, the computing system generates a series of persona alpha masks by processing the video-frame sequence that was received at step 502 and the sequence of image-depth data that was received at step 504. In at least one embodiment, the persona alpha masks generated at step 506 are binary, having (i) a first data value (e.g., 1 (one)) associated with each pixel in the corresponding frame that is representative of the persona and (ii) a second (i.e., different) data value (e.g., 0 (zero)) associated with each pixel that is in the corresponding frame but that is not representative of the persona.

At step 508, the computing system generates a sequence of histograms based on the video-frame sequence that was received at step 502 and the sequence of persona alpha masks that was generated at step 506. In at least one embodiment, the generated histograms reflect distributions along a brightness spectrum of pixels from the video-frame sequence (that was received at step 502) that match corresponding persona alpha masks (that were generated at step 506).

At step 510, the computing system selects video-capture adjustments based on the histograms that were generated at step 508. In at least one embodiment, selecting the video-capture adjustments based on the histograms involves time filtering the histograms to select video-capture adjustments that gradually adjust one or more video-capture settings of the video camera. In at least one embodiment, the video-capture adjustments pertain to one or both of exposure and gain.

At step 512, the computing system transmits the video-capture adjustments (that were selected at step 510) to the video camera for adjusting the continued capturing of the video-frame sequence.

Although features and elements are described above in particular combinations, those having ordinary skill in the art will appreciate that each feature or element can be used alone or in any combination with the other features and elements without departing from the scope and spirit of the present disclosure.

What is claimed is:

1. A method comprising:
receiving frames of video data that are being captured by a video camera and that are representative of an ongoing scene, the video camera having one or more adjustable video-capture settings;
identifying a persona in one or more of the received frames at least in part by identifying, in each such frame, a set of pixels classified as being representative of the persona;
selecting, based collectively on brightness values of the pixels in the identified set, a respective adjustment command for one or more of the adjustable video-capture settings; and
outputting the selected adjustment commands to the video camera for use by the video camera in continuing to capture video data representative of the ongoing scene.

2. The method of claim 1, wherein identifying a set of pixels classified as being representative of the persona in a given frame comprises:
obtaining a binary alpha mask for the given frame, the binary alpha mask having a first data value associated with each pixel that is in the given frame and that is classified as being representative of the persona, the binary alpha mask having a second data value associated with each pixel that is in the given frame and that is not classified as being representative of the persona, the second data value being different than the first; and
configuring the identified set of pixels for the given frame to include only those pixels that are associated with the first data value in the corresponding binary alpha mask.

3. The method of claim 2, wherein the first data value is 1 (one), and wherein the second data value is 0 (zero).

4. The method of claim 2, wherein obtaining the binary alpha mask for the given frame comprises generating the binary alpha mask by processing image-depth data of the given frame.

5. The method of claim 2, wherein obtaining the binary alpha mask for the given frame comprises receiving the binary alpha mask from a video processor that generated the binary alpha mask by processing image-depth data of the given frame.

6. The method of claim 1, wherein selecting, based collectively on brightness values of the pixels in the identified set, a respective adjustment command for one or more of the adjustable video-capture settings comprises:
generating a statistical model reflecting a distribution of said brightness values along a brightness spectrum; and
selecting a respective adjustment command for one or more of the adjustable video-capture settings based at least in part on the statistical model.

7. The method of claim 6, wherein the statistical model comprises a histogram.

8. The method of claim 6, wherein identifying a set of pixels classified as being representative of the persona in a given frame comprises:
generating a binary alpha mask for the given frame by processing image-depth data of the given frame, the binary alpha mask having a first data value associated with each pixel that is in the given frame and that is classified as being representative of the persona, the binary alpha mask having a second data value associated with each pixel that is in the given frame and that is not classified as being representative of the persona, the second data value being different than the first; and
configuring the identified set of pixels for the given frame to include only those pixels that are associated with the first data value in the corresponding binary alpha mask.

9. The method of claim 1, wherein the one or more adjustable video-capture settings include one or more video-capture settings selected from the group consisting of exposure, aperture, shutter speed, frame rate, gain, analog gain, digital gain, zoom, optical zoom, and digital zoom.

10. The method of claim 1, further comprising selecting, based at least in part on the pixels in the identified set, a respective adjustment command for one or more video-processing settings.

11. The method of claim 10, wherein the one or more video-processing settings include one or more video-processing settings selected from the group consisting of white balance, contrast, gain, vibrance, hue, saturation, color temperature, and sharpness.

12. The method of claim 1, wherein the video camera has an associated application programming interface (API), and wherein selecting one or more of the adjustment commands comprises selecting one or more of the adjustment commands from the API.

13. The method of claim 1, wherein at least one of the selected adjustment commands specifies a particular value for the corresponding adjustable video-capture setting.

14. The method of claim 1, wherein at least one of the selected adjustment commands specifies a relative change to the corresponding adjustable video-capture setting.

15. A video-capture controller comprising:
a frame-receiving module configured to receive frames of video data that are being captured by a video camera and that are representative of an ongoing scene, the video camera having one or more adjustable video-capture settings;
a persona-identification module configured to identify a persona in one or more of the received frames at least in part by identifying, in each such frame, a set of pixels classified as being representative of the persona;
a video-capture-adjustment module configured to select, based collectively on brightness values of the pixels in the identified set, a respective adjustment command for one or more of the adjustable video-capture settings; and
a command-output module configured to output the selected adjustment commands to the video camera for use by the video camera in continuing to capture video data representative of the ongoing scene.

16. The video-capture controller of claim 15, wherein the persona-identification module is further configured to a set of pixels classified as being representative of the persona in a given frame at least in part by:
obtaining a binary alpha mask for the given frame, the binary alpha mask having a first data value associated with each pixel that is in the given frame and that is classified as being representative of the persona, the binary alpha mask having a second data value associated with each pixel that is in the given frame and that is not classified as being representative of the persona, the second data value being different than the first; and configuring the identified set of pixels for the given frame to include only those pixels that are associated with the first data value in the corresponding binary alpha mask.

17. The video-capture controller of claim 15, wherein the video-capture-adjustment module is further configured to select a respective adjustment command for one or more of the adjustable video-capture settings at least in part by:

generating a statistical model reflecting a distribution of said brightness values along a brightness spectrum; and selecting a respective adjustment command for one or more of the adjustable video-capture settings based at least in part on the statistical model.

18. The video-capture controller of claim 15, wherein the one or more adjustable video-capture settings include one or more video-capture settings selected from the group consisting of exposure, aperture, shutter speed, frame rate, gain, analog gain, digital gain, zoom, optical zoom, and digital zoom.

19. The video-capture controller of claim 15, wherein the video camera has an associated application programming interface (API), and wherein selecting one or more of the adjustment commands comprises selecting one or more of the adjustment commands from the API.

20. The video-capture controller of claim 15, wherein at least one of the selected adjustment commands specifies either (i) a particular value for or (ii) a relative change to the corresponding adjustable video-capture setting.

* * * * *